Jan. 27, 1970  J. H. BORNZIN  3,491,523

FORAGE HARVESTING ATTACHMENT FOR COMBINES

Filed April 19, 1968

Inventor
James H. Bornzin

By
Attorney

United States Patent Office 3,491,523
Patented Jan. 27, 1970

3,491,523
FORAGE HARVESTING ATTACHMENT FOR COMBINES
James H. Bornzin, La Grange, Ill., assignor to International Harvester Company, Chicago, Ill., a corporation of Delaware
Filed Apr. 19, 1968, Ser. No. 722,751
Int. Cl. A01d 41/12
U.S. Cl. 56—2         6 Claims

ABSTRACT OF THE DISCLOSURE

A combine adapted to operate as a forage harvester, having a removable cylindrical cutter adapted to mount in place of a removable threshing cylinder, a removable cutting blade mountable adjacent the cutter, a removable separator shield for overlying and blocking the threshing grate concave and enclosing the cutter, and a removable discharge duct.

---

The present invention relates to agricultural combines and in particular to an arrangement whereby a combine may be adapted to function as a forage harvester with an insertable set of attachments including separator means and a rotatable cutter substitutable for the rotatable threshing means.

The invention enables existing or new combines to be utilized in a new function, namely forage harvesting, without in any way impairing or restricting the normal functions of the combine. Thus, the same combine may be conventionally used for threshing, grinding or shelling corn and may also be used for harvesting hay or forage utilizing any desired attachment or feature of the combine such as a cut-off head, pickup or cutter bar.

Further objects, features and advantages of the invention pertain to the particular arrangement and structure whereby the above mentioned aspects of the invention are attained. The invention will be better understood by reference to the following description and to the drawings forming a part thereof wherein.

Referring to FIGS. 1 through 4, there is shown therein a combine 10 in accordance with the present invention. It will be understood that it is a feature of the invention to utilize as many conventional combine units as possible. Accordingly, most of the components of the combine 10 are preferably conventional and need not be described herein. It will be understood that all components of the combine 10 not specifically described are preferably conventional. Exemplary combine components are those of the International Harvester Model 203 combine.

Figure 2:
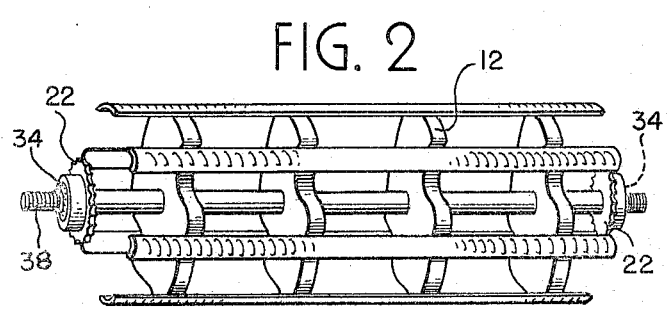
FIG. 2 is a perspective view of a threshing cylinder for the combine of FIG. 1.

The conventional combine 10 components preferably include a rotating threshing cylinder 12 shown in FIG. 2 and an associated threshing concave grate 14 thereunder. The threshing cylinder 12 and the grate 14 are fed by suitable conventional crop gathering means 16. The combine 10 also includes conventional means 18 for further processing of the crop after its passage past the threshing cylinder 12 and grate 14. The threshing cylinder 12 is conventionally rotatably driven by drive means 20 which here comprise a chain and sprocket drive. The threshing cylinder 12 is rotatably supported at its axial end bearings in the combine 10 by conventional rotatable mounting means.

Figure 1:
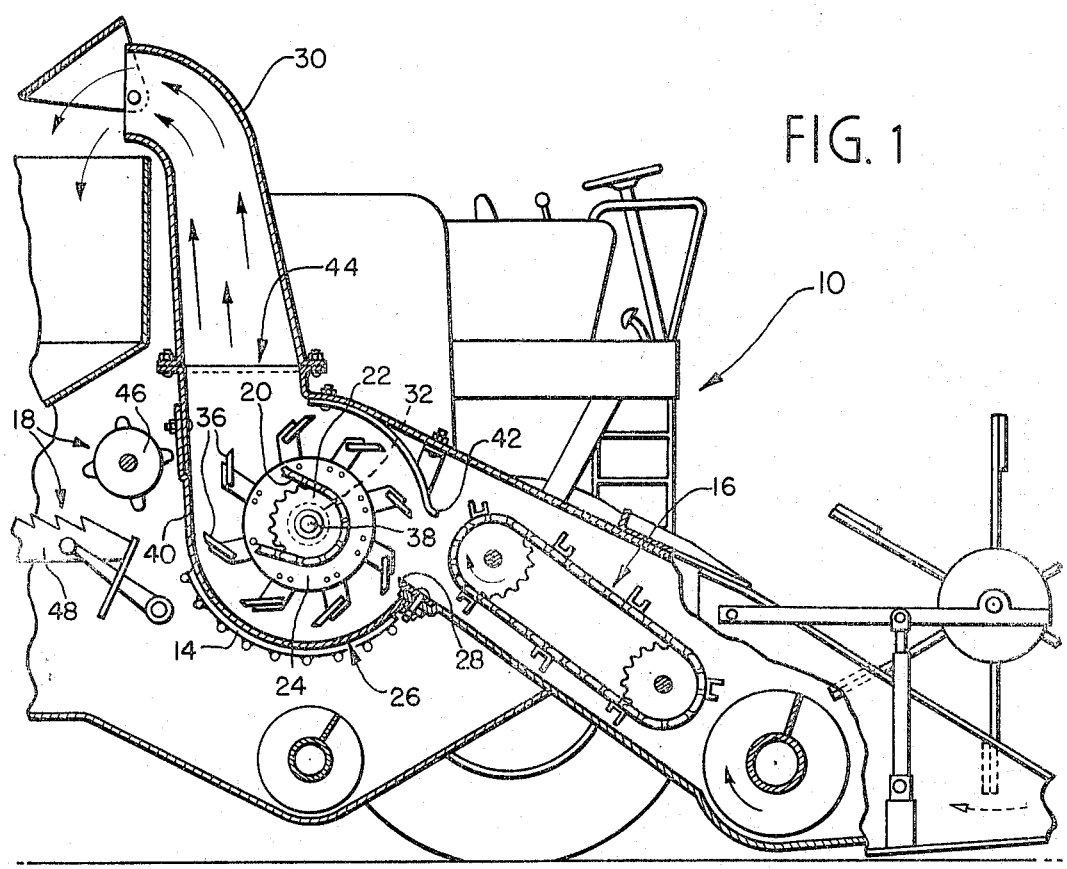
FIG. 1 is a sectional view of an exemplary embodiment of the invention.
Figure 4:
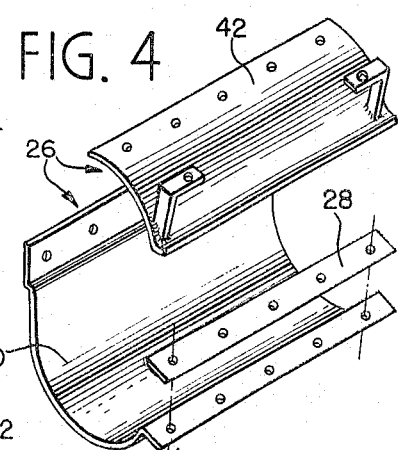
FIG. 4 shows the shield of the combine of FIG. 1.
Figure 3:
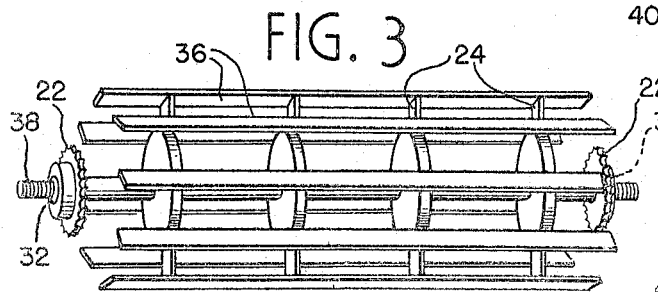
FIG. 3 shows the cylinder cutter of the combine of FIG. 1.

Considering the particular apparatus for adapting the combine to forage harvesting, this apparatus preferably includes a rotatable cylindrical cutter 24 as shown in FIG. 3, removable separator means 26 as shown in FIG. 4, a removable fixed cutting blade 28 as shown in FIG. 4, and removable duct means 30 as shown in FIG. 1.

Considering first the cutter 24 as shown in FIG. 3, it may be seen that it corresponds to the threshing cylinder 12 shown in FIG. 2. The cutter 24 is preferably a cylindrical unit adapted to axially mount into the combine 10 directly in the place of the threshing cylinder 12. Thus, for forage harvesting operation, the threshing cylinder 12 is removed and the cutter 24 is mounted in the same mounting means 22. The cutter 24 has axial bearing surfaces 32 at its opposite ends which are preferably identical to corresponding axial bearings 34 on the threshing cylinder 12. The cutter 24 is preferably of generally conventional forage harvester construction in its other respects and contains a plurality of circumferentially spaced chopping knives 36 thereon.

The cutter 24 is adapted to connect with the drive means 20 of the combine 10 to utilize the same power source for forage harvesting as is normally utilized by the threshing cylinder 12. The cutter 24 is here provided with a threaded shaft extension 38 which is adapted to connect with the conventional chain and sprocket drive means 20 of the combine 10 in the same manner as the threshing cylinder 12.

The fixed cutting blade 28 is adapted to removably mount in the combine 10 directly adjacent the surface of revolution of the chopping knives 36 on the cutter 24 to coact with the cutter 24 in chopping the crop. The cutting blade 28 is here located adjacent the forward edge of the concave grate 14. It will be appreciated that the crop is fed into the cutter 24 by the crop gathering means 16.

Considering the separator means 26 illustrated in FIGS. 1 and 4, its removable shields function to partially enclose the cutter 24 to confine and deflect the crop and to block the crop being chopped from the grate means 14 and from the means 18 for further processing of the crop. The separator means 26 causes the incoming crop to be discharged solely through the duct means 30 after the crop is chopped rather than allowing the crop to be processed through the combine 10 as in the normal threshing operation. The separator means 26 here comprises a lower shield 40 and an upper shield 42. Both the shields 40 and 42 are adapted to slide axially into the combine 10 and bolt to the combine housing for the forage harvesting operation. Both the lower shield 40 and the upper shield 42 may be formed inexpensively from sheet metal.

It may be seen that the lower shield 40 extends across, fully overlies and thereby blocks the concave grate 14. The lower shield 40 curves coaxially around the cutter 24 and is closely spaced from the surface of revolution of the cutter for approximately 120° to 130° past the cutting blade 28. The lower shield 40 then diverges from the surface of revolution of the cutter 24 and extends upwardly to an opening 44 to conduct the chopped crop into the duct means 30. Thus, the lower shield 40 blocks the normal outlet path to the rear of the concave grate 14 and provides a shield to block the crop from reaching the means for further crop processing 18 and specifically from the cylindrical beater 46 and the straw racks 48. It will be appreciated that the lower shield 40 and the cutting blade 28 may be inserted into the combine 10 as an integral unit.

The upper shield 42 extends from adjacent the opening 44 forward and around an upper portion of the surface of revolution of the cutter 24 and is closely spaced therefrom. As may be seen, the upper shield 42 terminates a substantial distance above the cutting blade 28 so as to provide a suitable entrance for the crop being fed into the cutter 24 from the crop gathering means 16.

It may be seen that the duct means 30 overlies the cutter 24 at the opening 44. The opening 44 is normally closed when the combine is not forage harvesting. The duct 30 conducts the chopped crop into a suitable storage tank or other desired location. The duct 30 may be a lightweight sheet metal unit readily removably bolted to the housing of the combine 10 with its open lower end overlying the opening 44.

The combine 10 is adapted for its forage harvesting function merely by the removal of the threshing cylinder 12, the substitution therefor of the cutter 24, the insertion of the cutting blade 28 and the shields 40 and 42, and the mounting of the duct 30. The other regular components of the combine 10 may be allowed to operate in their regular manner as they are blocked from receiving any crop. However, to conserve power or wear, other elements of the combine 10 such as its grain augers may be removed of disconnected from their power source if desired.

It may be seen that there has been described herein an improved combine with novel operating features for readily providing forage harvesting as well as the normal combine functions. The apparatus described herein is presently considered to be preferred; however, it is contemplated that further variations and modifications within the purview of those skilled in the art can be made herein.

What is claimed is:

1. In a combine of the type having gathering means for field borne crops, a threshing component having a housing, and
   conveying means for delivering crops from the gathering means to said housing,
   means for adapting said combine to forage harvesting comprising:
   rotatable cutter means in said housing,
   thresher cylinder drive means drivingly connectible with the cutter means;
   shear means removably mountable in said housing adjacent said rotatable cutter means for coacting therewith in chopping crop; and
   removable cutter enclosing wall means mountable in said housing for confining and deflecting said crop into an associated receptacle.

2. The apparatus of claim 1 and said receptacle comprising a tank on the combine and duct means for guiding cut crops from the cutter enclosing means into the receptacle.

3. Apparatus according to claim 2 and said duct means removably attachable to said combine adjacent and communicating with said cutter means for carrying chopped crop discharged by said cutter means.

4. Apparatus according to claim 1 wherein rotatable mounting means are at opposite sides of said housing and adapted to support said cutter means; and
   wherein said rotatable cutter means comprises an elongate generally cylindrical unit substantially corresponding to the width of said housing and having axial bearing means at opposite ends thereon adapted to be supported by said rotatable mounting means.

5. The apparatus of claim 1 wherein said removable wall means comprises a sheet metal shield readily insertable into said housing,
   separator means overlying partially circumferentially surrounding said cutter means.

6. The invention of claim 1 wherein said removable wall means comprises a sheet metal shield means readily insertable into said housing,
   said wall means overlying and closing unused portion of said combine and partially circumferentially surrounding said cutter means in said housing, and
   wherein said apparatus further includes duct means removably attachable to said combine adjacent and communicating with said cutter means for carrying chopped crop discharged by said cutter means.

References Cited

UNITED STATES PATENTS 1,485,532   3/1924   Ronning et al. _____ 56—2

F. BARRY SHAY, Primary Examiner

J. A. OLIFF, Assistant Examiner

U.S. Cl. X.R.

56—24; 146—107